US007908232B2

(12) United States Patent
Gregorius

(10) Patent No.: US 7,908,232 B2
(45) Date of Patent: Mar. 15, 2011

(54) TRAINING CONNECTIONS IN A MEMORY ARRANGEMENT

(75) Inventor: Peter Gregorius, Munich (DE)

(73) Assignee: Qimonda AG, Munich (DE)

( * ) Notice: Subject to any disclaimer, the term of this patent is extended or adjusted under 35 U.S.C. 154(b) by 837 days.

(21) Appl. No.: 11/844,791

(22) Filed: Aug. 24, 2007

(65) Prior Publication Data

US 2008/0052256 A1 Feb. 28, 2008

(30) Foreign Application Priority Data

Aug. 24, 2006 (DE) .......................... 10 2006 039 797

(51) Int. Cl.
*G06F 15/18* (2006.01)
(52) U.S. Cl. ........................................................ 706/16
(58) Field of Classification Search .................... 706/16
See application file for complete search history.

(56) References Cited

U.S. PATENT DOCUMENTS

| | | | | |
|---|---|---|---|---|
| 6,366,897 B1 * | 4/2002 | Means et al. | ..................... | 706/27 |
| 6,671,765 B1 * | 12/2003 | Karlsson et al. | ............. | 710/310 |
| 7,502,763 B2 * | 3/2009 | Ayala et al. | ........................ | 706/6 |
| 7,752,151 B2 * | 7/2010 | Nugent | ............................ | 706/15 |
| 7,814,038 B1 * | 10/2010 | Repici | ............................. | 706/25 |
| 7,827,124 B2 * | 11/2010 | McKinstry et al. | ............. | 706/14 |
| 2005/0144342 A1 | 6/2005 | Renaud et al. | | |
| 2006/0045031 A1 | 3/2006 | Hickey et al. | | |
| 2006/0053328 A1 | 3/2006 | Panikkar et al. | | |
| 2006/0092969 A1 | 5/2006 | Susnow et al. | | |
| 2006/0095646 A1 | 5/2006 | Gower et al. | | |

OTHER PUBLICATIONS

Single-ended Coding Techniques for Off-chip Interconnects to Commodity Memory, Choudhury, M.; Ringgenberg, K.; Rixner, S.; Mohanram, K.; Design, Automation & Test in Europe Conference & Exhibition, 2007. DATE '07 Digital Object Identifier: 10.1109/DATE.2007.364436 Publication Year: 2007 , pp. 1-6.*
Estimation of receiver frequency error in a TDOA-based direction-finding system, Falk, J.; Handel, P.; Jansson, M.; Signals, Systems and Computers, 2004. Conference Record of the Thirty-Eighth Asilomar Conference on vol. 2 Digital Object Identifier: 10.1109/ACSSC.2004.1399532 Publication Year: 2004 , pp. 2079-2083 vol. 2.*
Incremental multi-hop scheduling algorithms for all-optical broadcast-and-select networks with arbitrary tuning latencies, Bianco, A.; Guido, M.; Leonardi, E.; Global Telecommunications Conference, 2000. GLOBECOM '00. IEEE vol. 2 Digital Object Identifier: 10.1109/GLOCOM.2000.891348 Publication Year: 2000 , pp. 1313-1318 vol. 2.*
Incremental scheduling algorithms for WDM/TDM networks with arbitrary tuning latencies, Bianco, A.; Guido, M.; Leonardi, E.; Communications, IEEE Transactions on vol. 51 , Issue: 3 Digital Object Identifier: 10.1109/TCOMM.2003.809719 Publication Year: 2003 , pp. 464-475.*

* cited by examiner

*Primary Examiner* — Michael Holmes
(74) *Attorney, Agent, or Firm* — Dicke, Billig & Czaja, PLLC

(57) ABSTRACT

A method of training connections in a memory arrangement includes training a connection between a memory section and a receiver portion of a controller for controlling the memory arrangement before or simultaneously with a training of essentially all other connections between elements of the memory arrangement that are to be trained.

26 Claims, 9 Drawing Sheets

TRAINING CONNECTIONS IN A MEMORY ARRANGEMENT

CROSS-REFERENCE TO RELATED APPLICATIONS

This Utility Patent Application claims priority to German Patent Application No. DE 10 2006 039 797.5, filed on Aug. 24, 2006, which is incorporated herein by reference.

BACKGROUND

The present disclosure relates to methods of training connections in a memory arrangement and corresponding memory arrangements.

SUMMARY

One embodiment provides a method of training connections in a memory arrangement. The method includes training a connection between a memory section and a receiver portion of a controller for controlling the memory arrangement before or simultaneously with a training of essentially all other connections between elements of the memory arrangement that are to be trained.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

In the following, illustrative embodiments of the invention which are to be taken only as examples and not to be construed as limiting will be described with reference to the attached drawings. Illustrated are.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Embodiments of the invention will be described in the following. Some features and terms used in some embodiments are first explained with reference to FIGS. 1 and 2, before embodiments are presented with reference to FIGS. 3-11.

Figure 1:
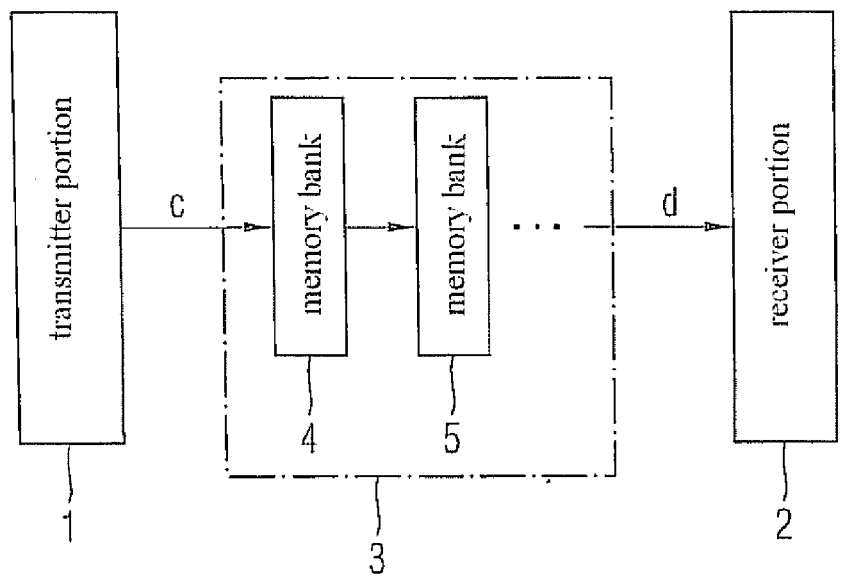
FIG. 1 is a block diagram of a memory arrangement according to an embodiment.

FIG. 1 illustrates a block diagram of an exemplary memory arrangement according to an embodiment, which is implemented in loop forward technology. The memory arrangement illustrated in FIG. 1 includes a control unit 1, 2 with a transmitter portion 1 for transmitting data c to a memory section 3 and a receiver portion 2 for receiving data d from the memory section 3. In one embodiment, the control unit is a memory controller, which transmits address signals, control signals and data signals separately to the memory, or receives them from it. The data c and d may be transmitted on a frame or packet basis in the illustrated embodiment. In this context the term "data" should be understood to be general, and can include payload data, such as stored data from or data for storage in memory section 3, as well as control and address data, wherein different packets or frames may carry the same or different types of data. In another embodiment, other types of data transmission other than frame- or packet-based transmission may be used.

In the illustrated embodiment, the connection for the transmission of data c is separated from the connection for the transmission of data d, these being two unidirectional connections, in particular serial data connections. However, certain embodiments include parallel connections, in which data is transmitted in parallel, bi-directional connections or mixed forms.

The memory section 3 may contain one or more memory banks (memory ranks). In the example illustrated in FIG. 1, the memory section 3 includes two memory banks 4 & 5, but versions with only one memory bank or more than two memory banks are also possible, as is explained in more detail below.

In the memory illustrated arrangement, the memory banks 4, 5 are connected one after the other, the transmitter portion 1 being connected to the first memory bank 4, while the receiver portion 2 is connected to the last memory bank, for example memory bank 5 in the case of two memory banks. For example, if certain data c is sent for the second memory bank 5, it is passed from the first memory bank 4 to the second memory bank 5. As already mentioned, the connections for the data c and d may be serial or parallel connections, and the same applies to the connections between the memory banks.

In the embodiment of FIG. 1, within the memory banks the individual memory cells are then read or written in parallel, for example, for which a corresponding conversion of the data takes place between the format used within the memory banks 4, 5 and the format used for the communication between the memory banks 4, 5 and the control unit (e.g., a serial/parallel conversion).

Each memory bank thus contains, for example, interfaces for receiving high-speed serial data and for converting this data to internal parallel data, and for converting internal parallel data to serial high-speed data. Each memory bank 4, 5 further includes a repeater function, in order to pass on serial high-speed data to a subsequent memory bank. This is explained in an exemplary manner in more detail below with reference to further embodiments.

In such high-speed connections, in an embodiment initialization and/or training is performed for example in a power-up of the system after it is switched on, in order to match the timing behaviour of the transmitter and receiver to each other. In embodiments, training of a connection should be understood generally as a tuning of transmitter and receiver to each other, for example with regard to timing. Training of a connection in the following should generally be understood in this context and may refer to a training of the connection during a power-up and initialization of a memory arrangement, but also may refer to training during operation, as connection faults occur for example.

Figure 2:
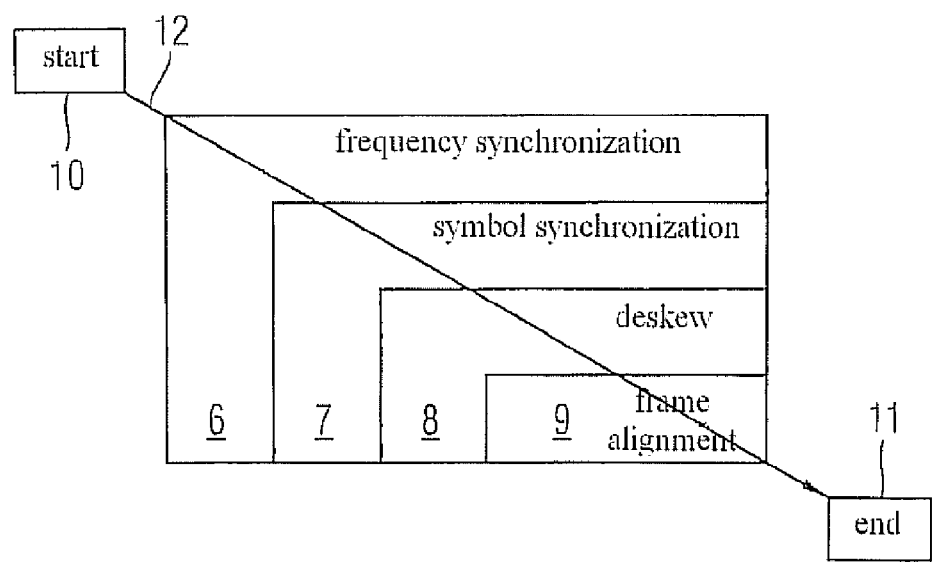
FIG. 2 is a diagram illustrating an embodiment of a method of training a connection employed in particular embodiments.

An initialization or training which may be employed in an embodiment of a method are illustrated in FIG. 2.

The training is started at 10. This can occur for example as a result of a power-up of the system or a reset signal. An arrow 12 symbolizes the progress of the training.

At 6, a frequency synchronization takes place between the respective transmitters and receivers. Transmitters here are, for example, the transmitter portion 1 of the control unit from FIG. 1, and also transmitters for forwarding the data in the memory banks 4 and 5. Correspondingly, receivers here are, for example, the receiver portion 2 and also corresponding receivers in the memory banks 4 and 5. This frequency synchronization is effected for example with phase-locked loops (PLL), frequency-locked loops (FLL) or delay-locked loops (DLL). In an embodiment, source synchronous clocking is employed, in which the clock signal is generated on the transmitter side and is received by the respective receiver, while in another embodiment mesosynchronous clocking is employed, in which a clock signal is centrally generated and accepted by transmitter and receiver. Other clocking schemes may be used in other embodiments (e.g., procedures in which a clock signal is generated in the receiver and is accepted by the transmitter).

At 7 in FIG. 2, a symbol synchronization is performed. In other words the phase relationship of the clock signal is adapted to the phase relationship of the received data signal, so that the sampling of the symbols of the received data signal occurs at the appropriate times. An example of such symbols is individual bits in binary signals. The methods applicable in embodiments comprise, for example, conventional clock and data Recovery (CDR) methods.

At 8, the skew between different lines is then balanced out (lane to lane deskew). This is relevant in particular if, for example, the data c is sent on two or more lines with two or more serial data streams, rather than over a single serial line. In this case the timing of the different connections in an embodiment is tuned in such a way that data belonging together, such as data belonging to one frame, is correctly reassembled.

At 9, a frame alignment or frame synchronization is performed, in other words it is determined where the individual transmitted frames, which for example, can include eight separate symbols, begin and end. After the frame alignment at 9, the training of the connection is ended at 11.

The steps 7, 8 and 9 in an embodiment are carried out via predetermined training sequences, which are sent by the respective transmitter and then evaluated on the receiver side. This evaluation may be carried out directly in the respective receiver or centrally, as is explained in more detail below.

As is similarly explained in more detail below, it is possible in embodiments to combine steps 7 and 9 or to exchange them, so that the frame synchronization can take place at the same time as the symbol synchronization or before it.

The training of connections will now be explained in detail relative to further embodiments.

Figure 3:
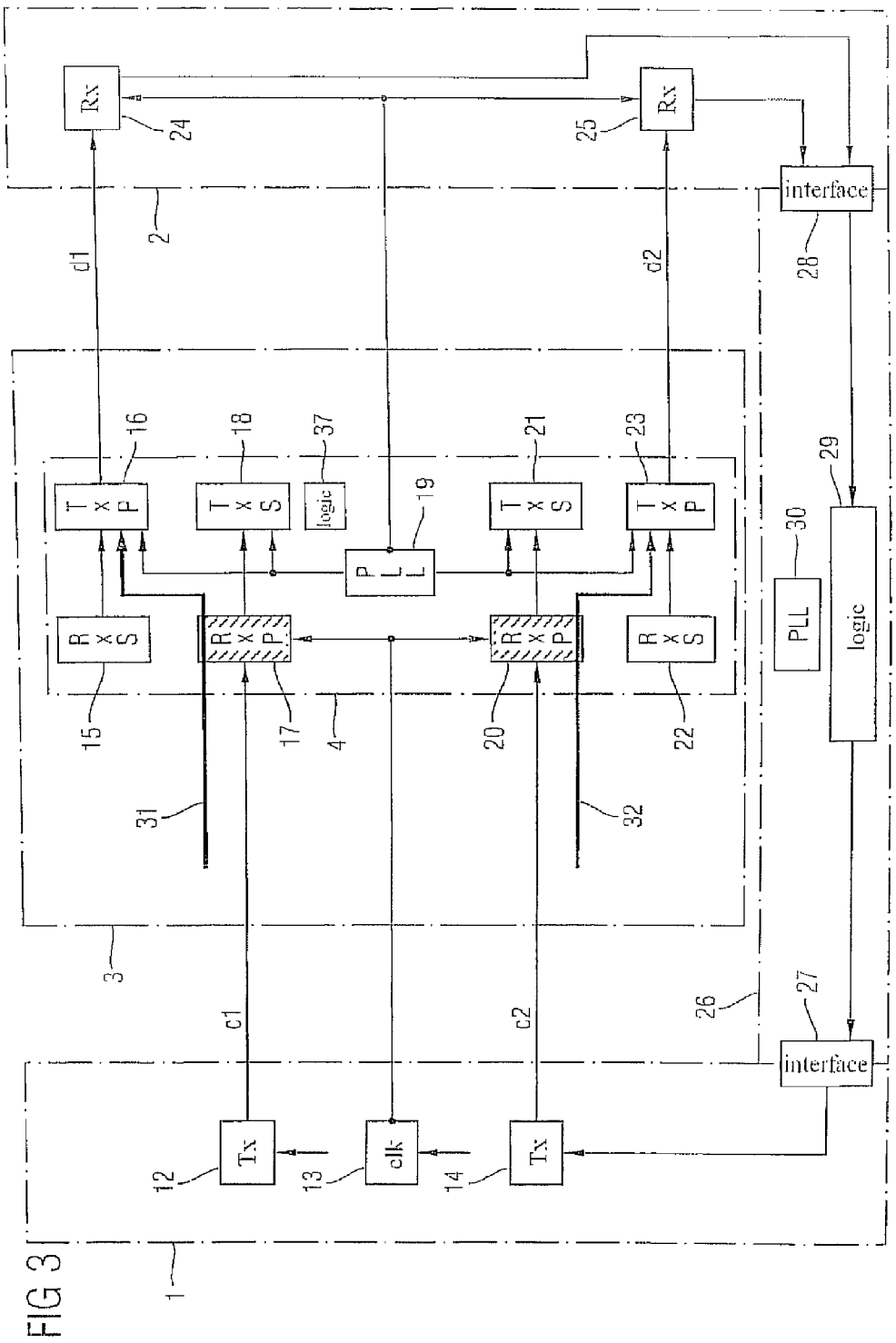
FIG. 3 a detailed block diagram of an embodiment of a memory arrangement.

An embodiment of a memory arrangement is illustrated in FIG. 3. The memory arrangement illustrated in FIG. 3 includes a memory section 3 containing a single memory bank 4 (referred to as single rank system). The transmitter portion 1 and the receiver portion 2 of the control unit are illustrated separately for reasons of clarity. However, they may be integrated in a single chip.

In the memory arrangement illustrated in FIG. 3, data c, d already explained with reference to FIG. 1 is transmitted in parallel over two connections. These connections in turn may have one or more lines for transmitting the data. In the embodiment of FIG. 3, the transmitter portion 1 of the control unit includes a first transmitter 12 and a second transmitter 14, the first transmitter 12 transmitting data c1 and the second transmitter 14 transmitting data c2 to the memory bank 4 of the memory section 3. The transmitter portion 1 further comprises a clock generator 13, which provides the clock for the transmitting of the data c1 and c2, a corresponding clock signal also being transmitted to the memory bank 4. In FIG. 3, the clock signal is also transmitted via the connections used for transmitting the data c1 and c2. In another embodiment, a separate connection may be provided for the clock signal.

The connections between the control unit and the memory section 3 in the illustrated embodiment are differential connections, meaning that differential signals are transmitted on the corresponding lines. However, in another embodiment single-ended signals may be applied.

As already explained data c1, c2 comprises combined control, address and payload data. In this case payload data is, for example, data that is to be stored in the memory section 3, address data is, for example, data giving an address in the memory section at which data is to be stored or from which data is to be retrieved, and control data specifies, for example, whether the action involved is writing to the memory section 3 or reading from the memory section 3.

The data c1 is received in the memory bank 4 by a primary receiver 17, while the data c2 is received by a primary receiver 20.

In a normal operation of the memory arrangement (i.e., after the initialization or training of the connections) payload data is written to a memory (not illustrated in FIG. 3) of the memory bank 4 or read from the memory, dependent on the received data c1, c2. This is controlled by an internal memory controller (likewise not illustrated in FIG. 3) of the memory bank 4. These further components of the memory bank 4 are not illustrated in FIG. 3 in order to simplify the illustration, but they are explained again below in the context of FIG. 11.

Payload data read out from the memory of the memory bank 4 is transmitted in the memory's normal operation by primary transmitters 16, 23 as data d1, d2 to receivers 24, 25 of the receiver portion 2.

Here the terms "primary transmitter" and "primary receiver" indicate that these are the receivers and transmitters which serve for receiving data that was generated in the transmitter portion 1, or for transmitting data that was generated in the memory bank 4.

Memory bank 4 also includes secondary receivers 15 and 22, which are directly connected to the primary transmitters 16 and 23 as illustrated in FIG. 3. Also provided on the other side are secondary transmitters 18 and 21, which are illustrated in FIG. 3 connected to the primary receivers 17 and 20 respectively. Repeaters are hereby implemented, with which received data can be passed on immediately. These repeaters are not required for the operation of the memory arrangement illustrated in FIG. 3 with only one memory bank, and can therefore also be omitted. As is explained below in detail with respect to other embodiments, they enable implementation of memory arrangements with more than one memory bank. If the secondary receivers 15, 22 and the secondary transmitters 18, 21 are provided in general, memory arrangements with one memory bank as well as memory arrangements with multiple memory banks can be implemented with the same module in such an embodiment.

As already mentioned, the transmitter portion 1 includes a clock generator 13. This supplies a clock for the transmitters 12 and 14 on the one hand, and on the other hand also supplies a clock signal for the primary receivers 17 and 20, as illustrated in FIG. 3. The transmitters 12, 13 and the receivers 17, 20 thus work with the same clock frequency, so that there is a frequency synchronization (such as at 6 in FIG. 2) here.

The memory bank 4 further includes a phase-locked loop (PLL) 19, which supplies a clock signal to the primary and secondary transmitters 16, 18, 21 and 23, as well as to the receivers 24 and 25 of the receiver portion 2 of the control unit. Thus there is also a frequency synchronization here. The phase-locked loop 19 can likewise receive a reference clock signal from the clock generator 13, while in a case of this kind the clock generator 13 itself generates a clock signal, for example by means of a quartz oscillator. However, it is also possible to generate a central clock signal from a phase-locked loop 30 (e.g., in combination with a quartz oscillator) and to supply it to the clock generation device 13 and the phase-locked loop 19 as a reference clock signal in each case. After the settling of the phase-locked loops 19, 30 the frequency synchronization of the memory arrangement has then taken place.

The phase-locked loop 30 may be accommodated in a control section 26 in an embodiment, which is integrated together with the transmitter portion 1 and the receiver portion 2 in the control unit of the memory arrangement.

The control unit 26 further includes a logic circuit or unit 29 for the training of the connections between the transmitter portion 1 and the memory bank 4, or the memory bank 4 and the transmitter portion 2. This logic unit 29 can be implemented as a state machine. The training itself may take place, as is explained in detail below, with the help of predetermined training sequences, such as bit patterns.

These training sequences are sent under the control of the logic unit 29 or an internal logic unit 37, a status signal reporting back the status of training to the logic unit 29. For this feedback, additional connections are provided in the embodiment illustrated in FIG. 3, between the primary receiver 17 and the primary transmitter 16, and also between the primary receiver 20 and the primary transmitter 23, as symbolized by arrows 31 and 22. These additional connections are only active during the training in the embodiment of FIG. 3, and are accordingly developed as switchable by transistors or other switching devices.

In order that the status signal can be supplied to the logic unit 29, in the embodiment illustrated in FIG. 3 the connection between the memory bank 4 and the receiver portion 2 is trained before or at the same time as the connection between the transmitter portion 1 and the memory bank 4. For training the connection between the memory bank 4 and the receiver portion 2 (i.e., the connections via which the data d1 and d2 is sent in normal operation) the primary transmitters 16 and 23 independently transmit corresponding training sequences when the system is being powered up for example, which are evaluated in the receiver portion, in order to carry out the necessary synchronizations as at 7-9 in FIG. 2, after the frequency synchronization as already described is performed. The transmitting of these training sequences may be controlled by the internal logic unit 37.

On the other side the logic unit 29 activates the transmitter 12 and the transmitter 14 likewise to transmit a known training sequence when the system is being powered up, this sequence being evaluated in the memory bank 4 and in particular in the primary receivers 17 and 20, in order to carry out the appropriate synchronizations. The internal logic unit 37 can similarly be used in this evaluation.

In particular, in an embodiment there may be parallel training by the internal logic unit 37, between the transmitter portion 1 and the memory bank 4 on one side, and the memory bank 4 and the transmitter portion 2 on the other side. Thus during this training the memory bank 4 acts as master for the connection between the memory bank 4 and the transmitter portion 2, while the logic unit 29 controls the training of the connection between the transmitter portion 1 and the memory bank 4. A status signal then reports to the logic unit 29 when the training is completed.

If it then becomes necessary during the operation of the memory arrangement to retrain individual connections, the logic unit 29 can assume control here in any case, for example by activating the primary transmitters 16 and 23 of the memory bank 4 to train the connections between the memory bank 4 and the receiver portion 2.

The receiver portion 2 communicates with the logic unit 29 over an interface 28 of the control section 26, while the communication of the logic unit 29 with the transmitter portion 1 is handled via an interface 27 of the control section.

Figure 4:
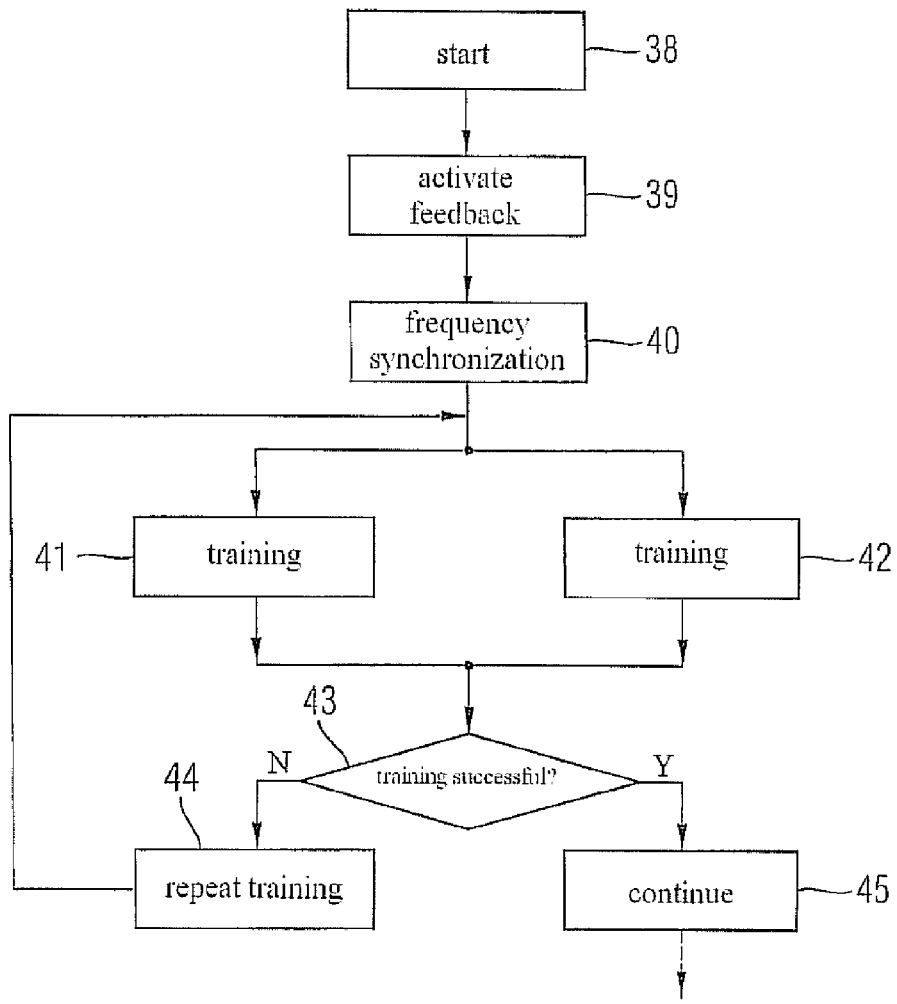
FIG. 4 a flowchart of an embodiment of a method of training connections in the memory arrangement of FIG. 3.

The sequence explained above for the training of the connections is illustrated in summary in a flowchart in FIG. 4 representing an embodiment of a training method.

The method begins at 38 with the power-up of the system or when a reset signal triggers a reset of the system; training can be triggered by a "hard reset", which in general effectively amounts to a hard switching off and on of the system, as well as by a "soft reset", in which only certain parts of the system are restarted.

At 39, the logic unit 29 then activates the memory section 3 and in particular the memory bank 4 to switch into feedback mode (i.e., to activate the connections marked by the lines 31 and 32) in order to execute the training.

Next, at 40, the frequency synchronization is executed, which as already described essentially corresponds to the locking in of the phase-locked loops 19 and 30. Steps 39 and 40 can also be executed in the reverse order.

In the embodiment of the method illustrated in FIG. 4, the training of the connection between the transmitter portion 1 and the memory bank 4 is then undertaken at 41, and in parallel (i.e., simultaneously with this) the training of the connection between the memory bank 4 and the receiver portion 2 at 42.

Steps 41 and 42 here cover as described the transmitting of training sequences, in order to undertake a symbol synchronization and a frame synchronization, as well as a correction of the skew between different lines (deskew). Depending on the number and allocation of the available lines, a distinction can be made here between correction of the skew between lines of a single half-byte (nibble) and the correction of the skew between different half-bytes. For example, the data c1 from FIG. 3 can represent a first half-byte and the data c2 from FIG. 3 a second half-byte, the corresponding connections in FIG. 3 each being able to have a plurality of lines.

Figure 5:
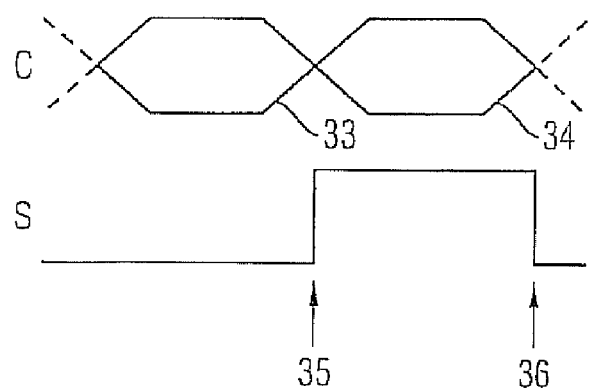
FIG. 5 is a diagram illustrating an example of a status signal in the memory arrangement of FIG. 3 or the method of FIG. 4.

As already explained, a status signal is sent over the connection between the memory bank 4 and the receiver portion 2 and evaluated in the logic unit 29, which is what happens at 43. An example of such a status symbol is represented in FIG. 5. A training signal is schematically illustrated in the upper line, which for example is sent instead of the data c (c1 and c2) for training the connection between the transmitter portion 1 and the memory bank 4. This training signal comprises a section 33 with a test sequence for symbol synchronization and a section 34 with a test sequence for setting the frame synchronization.

When symbol synchronization has taken place, a status signal s can then for example jump from 0 to 1 as indicated by reference numeral 35, and then return from 1 to 0 after frame synchronization has taken place as illustrated by reference numeral 36. After the status signal s has made the switch from 0 to 1 and 1 to 0, the logic unit 29 accordingly knows that the training of the corresponding connection was successfully completed.

If the training was successfully completed, then at 45, as indicated by a broken arrow, either a transition to normal operation follows, or further necessary initialization steps are undertaken for the memory arrangement. If there is no confirmation of a successful training from the status signal, it is determined at 44 that a renewed training is necessary, and a branch back to 41 and 42 follows, for example, as indicated by the arrow. However, it is equally feasible to begin the further training at 40, for example.

In the embodiment of FIG. 4, steps 41 and 42 are executed in parallel. However, it is equally possible to execute first step 42 and then step 41 in another embodiment. In this case the internal logic unit 37 can essentially be omitted, as in this case it is only necessary that on power-up of the system the primary transmitters 16 and 23 transmit predefined test sequences. If the connection between the memory bank 4 and the receiver portion 2 is trained in this way, the training of the connection between the transmitter portion 1 and the memory bank 4 can also be executed by the logic unit 29, since then the evaluation is handled in the logic unit 29 using the previously trained connection between the memory bank 4 and the receiver portion 2.

With regard to the parallel or sequential training of multiple connections, it should be noted that in this context also with regard to the training of parallel running lines, different variants are possible. This will now be explained with reference to an example.

As an example for this it should be assumed that the connections illustrated in FIG. 3 for transmission of the data c1 and c2 each comprise four individual lines, for which the transmitters 12 and 14 and the primary receivers 17 and 20 then also have a corresponding number of individual transmitters or individual receivers respectively for the individual lines. The four lines used for the transmission of the data c1 serve here for the transmission of a first half-byte (nibble), while the lines for the transmission of the data c2 form data of a second half-byte. The following training sequences, among others, are then possible for this example in various embodiments:

- All lines are trained in succession; for example, first the four lines of the first half-byte are successively trained, and then successively the four lines of the second half-byte, other sequence orders also being possible.
- The lines of one half-byte are trained in parallel, while the two half-bytes are successively trained. For example, first the four lines of the first half-byte are trained in parallel time, and then the four lines of the second half-byte are trained in parallel time.
- All lines are trained in parallel (i.e., the four lines of the first half-byte are trained simultaneously with the four lines of the second half-byte).

Naturally, other combinations are also possible. Furthermore, while two connections each having four individual lines have been used as an example, any other number of connections or lines is equally feasible in an embodiment.

Figure 6:
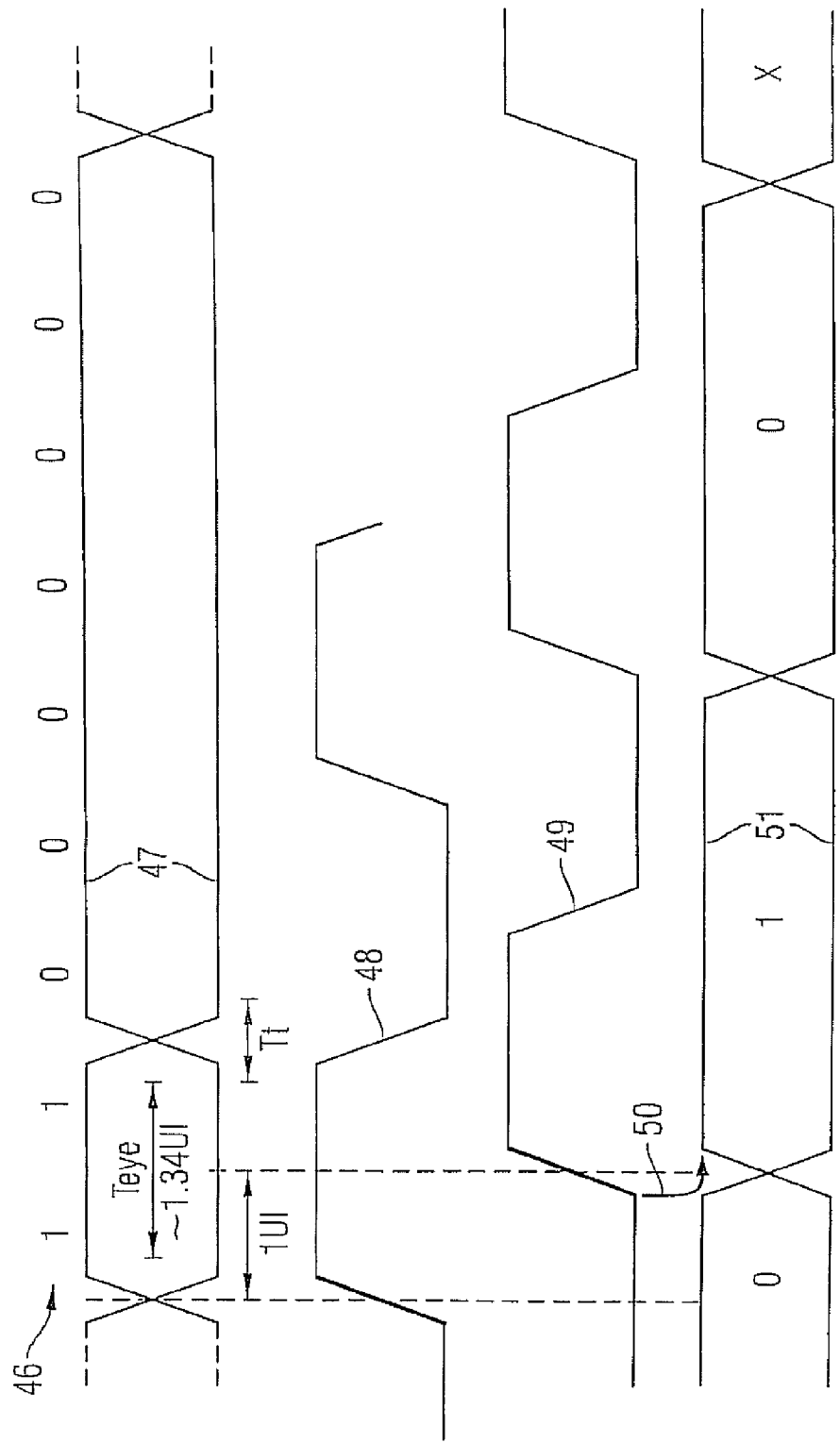
FIG. 6 is a diagram illustrating an exemplary representation of signals for frame synchronization.

The training of a line, and the training sequences used for this, will now be explained in more detail with reference to examples. In this context, FIG. 6 illustrates a possibility for frame synchronization. Here a frame can generally comprise an even or an odd number of symbols, the symbols in the example illustrated being individual bits, which can assume a value of 1 or a value of 0. However, in embodiments symbols may also assume more than two different values.

The reference numeral 46 in FIG. 6 denotes a training sequence for frame synchronization, a frame comprising 9 bits in this case. The training sequence used, 110000000, is transmitted repeatedly.

The reference numeral 47 denotes a differential test signal corresponding to the training sequence, this signal being sent for example from the transmitter portion 1 to the memory bank 4 for training the connection between transmitter portion 1 and memory bank 4. UI denotes a unit interval in the drawing (i.e., the length of a symbol) in the present case of a bit. By the two successive ones of the test signal sequence, the signal 47 is kept at a value of 1 for a time Teye of about 1.34 unit intervals; the remaining time is used for the transition to the value 0. During this transitional time Tt, no reliable sampling is generally possible.

For the frame synchronization, the signal 47 is now sampled with four clock signals offset by 90° with respect to each other, of which two clock signals 48, 49 are illustrated. These clock signals may also be used for sampling incoming signals in normal operation; such a use of signals offset from one another is applied in high-speed communication systems to achieve higher data rates. However, it is equally possible that only signal 48 corresponds to the clock signal used during normal operation, and the clock signal 49 and the further clock signals (not illustrated) are generated by a delay unit, for example, for setting the frame synchronization.

As illustrated in FIG. 6, a "1" is correctly sampled by at least one of the clock signals; in the example illustrated, by the clock signal 49. Since even if one clock signal, as in the presented case the clock signal 48, falls exactly on the transition between "1" and "0" (i.e., in the most unfavourable way) the subsequent clock signal falls precisely in the marked period Teye, during which the sampling of a "1" is possible. Thus, as indicated by the arrow 50, the clock signal 49 supplies the signal 51 as the result of the sampling, if sampling is only with the rising edges of the clock signals as for example in single data rate (SDR) memories.

In an embodiment only the clock signals 48 and 49 illustrated, are used in case both rising and falling edges are correspondingly used for sampling as for example in double data rate (DDR) memories. In this case there are also four sampling instants offset in each case by 90°, with which in any case at least one "1" is sampled.

The beginning of the frame can thus be determined by the sampled "1". To determine the frame more precisely, the sampling signals may then be phase-shifted so long in one direction until the two ones or the entire test signal sequence is actually correctly sampled.

With the method illustrated in FIG. 6, it is possible to perform the frequency synchronization before the symbol synchronization (i.e., to change the order illustrated in FIG. 2 accordingly).

On the other hand, if as illustrated in FIG. 2 the symbol synchronization is done before the frame synchronization (i.e., the clock signals are first aligned in such a way in relation to the incoming signals in the respective receiver that the incoming signals) in the present example the individual bits, are correctly sampled, then the training sequence illustrated in FIG. 6 can be used for frame synchronization. Since in this case the individual bits are correctly sampled, the sampled two successive "1" values mark the beginning of the frame in this case.

However, other symbol sequences are naturally also possible as training sequences for the frame synchronization. For frame synchronization in an embodiment training sequences are used which have a sequence of cyclic patterns with not too high an edge density (i.e., with not too great a number of changes from 1 to 0 and conversely). Further examples of such frames in a training sequence for frame synchronization are "11000011" or "11100000" for 8-bit frames. The reason for this is that, as explained with reference to FIG. 6, with two successive bits with the same value, at least one sampling signal correctly samples the corresponding value.

For the symbol synchronization, on the other hand, in an embodiment a training sequence is used which has a high edge density (i.e., many changes from 0 to 1 and back (for example, bit sequences such as 1010101010 or 110011001100)), as with such bit sequences the boundaries between the symbols or individual bits are more quickly detectable. This becomes clear if the signal 47 from FIG. 6 is considered. Symbol boundaries can only be recognized in the transition between 1 and 0, while during the seven "0" symbols, for example, no change of the signal 47 and thus no symbol boundaries are detectable.

The symbol synchronization can then, for example, use suitable clock and data recovery (CDR) mechanisms known from communication technology.

By choosing suitable training sequences in an embodiment of the invention it is also possible to perform the frame synchronization and the symbol synchronization simultaneously. Suitable test sequences for this are for example, 11010011 or 10111101 for 8-bit frames and 000000011 or 011010110 for 9-bit frames. These test sequences have a sufficient density of edge changes for efficient symbol synchronization, but can also be used for frame synchronization corresponding to the principle explained in FIG. 6.

Embodiments are not restricted to memory arrangements with one memory bank. In this context, FIG. 7 illustrates a detailed block diagram of embodiment of a memory arrangement, in which the memory section 3 includes two memory banks 4 and 5.

Figure 7:
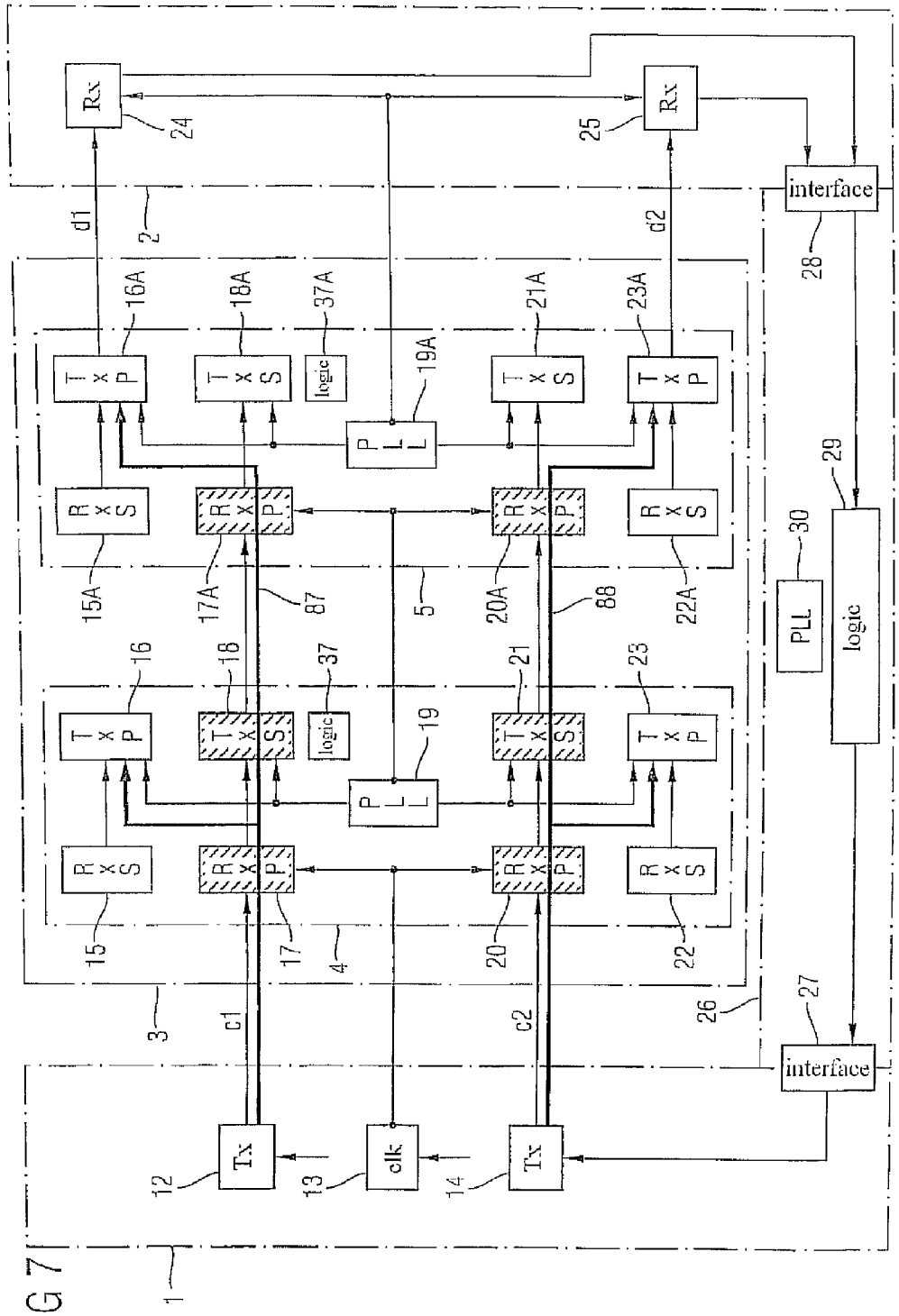
FIG. 7 a detailed block diagram of an embodiment of a memory arrangement.

The basic structure of the memory arrangement of the embodiment of FIG. 7 corresponds to that of FIG. 3, and similar or corresponding components are marked with the same reference numerals. In particular, the control unit with transmitter portion 1, receiver portion 2 and control section 26 in FIG. 7 corresponds to the control unit of FIG. 3, and the memory bank 4 from FIG. 7 comprises similar elements as the memory bank 4 from FIG. 3. These elements are therefor not explained again in detail.

The memory bank 5 from FIG. 7 also comprises similar elements as the memory bank 4 from FIG. 3. Corresponding elements of the memory bank 5 have the same reference numeral as corresponding elements of the memory bank 4, supplemented with an "A".

The repeater functions already mentioned with reference to FIG. 1 have been implemented with the secondary transmitters 18, 21 of the memory bank 4 and with the secondary receivers 15A, 22A of the memory bank 5. In particular, data c1 that is intended for the second memory bank 5 in the embodiment of FIG. 7 is forwarded by the primary receiver 17 and the secondary transmitter 18 to the primary receiver 17A of the second memory bank 5. Correspondingly, data c2 intended for the memory bank 5 is forwarded by the primary receiver 20 and the secondary transmitter 21 to the primary receiver 20A of the memory bank 5.

On the other side, in the embodiment of FIG. 7 data that is sent by the primary transmitter 16 of the memory bank 4 and is intended for the receiver portion 2 is forwarded via a secondary receiver 15A and the primary receiver 16A of the memory bank 5. In a corresponding manner, data sent by the primary transmitter 23 is forwarded by the secondary receiver 22A and the primary transmitter 23A.

As already described for the phase-locked loop 19 of the memory bank 4 with reference to FIG. 3, the phase-locked loop 19A of the memory bank 5 may also receive a reference clock signal from a central clock generation, such as the phase-locked loop 30, or from the phase-locked loop 19.

To enable parallel training of multiple connections, an internal logic unit 37A may also be provided in the memory bank 5.

It should be remarked in turn that in the memory arrangement of FIG. 7 the secondary receivers 15 and 22 and the secondary transmitters 18A and 21A are not used and may be omitted. In the embodiment illustrated in FIG. 7, the memory banks 4 and 5 have the same structure such that only a single type of memory bank is needed in the embodiment illustrated.

In the memory arrangement of FIG. 7, the connections between the memory bank 4 and the memory bank 5 in an embodiment are also be trained in addition to the connections between the transmitter portion 1 and the memory bank 4, and the memory bank 5 and the receiver portion 2. For this in the embodiment connections are provided between the primary receivers and primary transmitters of each memory bank, as indicated by arrows 87 and 88.

The methods for training the individual connections in an embodiment of the invention comprise one or more of those explained with reference to FIG. 3, in other words appropriate training sequences are transmitted and evaluated. Likewise, the possibilities already explained for parallel or sequential training of multiple half-bytes or multiple lines are also applicable for the memory arrangement of FIG. 7.

As already explained with reference to FIG. 3, in the embodiment illustrated, the connection toward the receiver portion 2 (i.e., the connection between the memory bank 5 and the receiver portion 2) in an embodiment is trained first or within the first part of the training, in order to enable a report back to the logic unit 29.

Various methods for training the connections of FIG. 7 according to the embodiments will now be explained.

Figure 8:
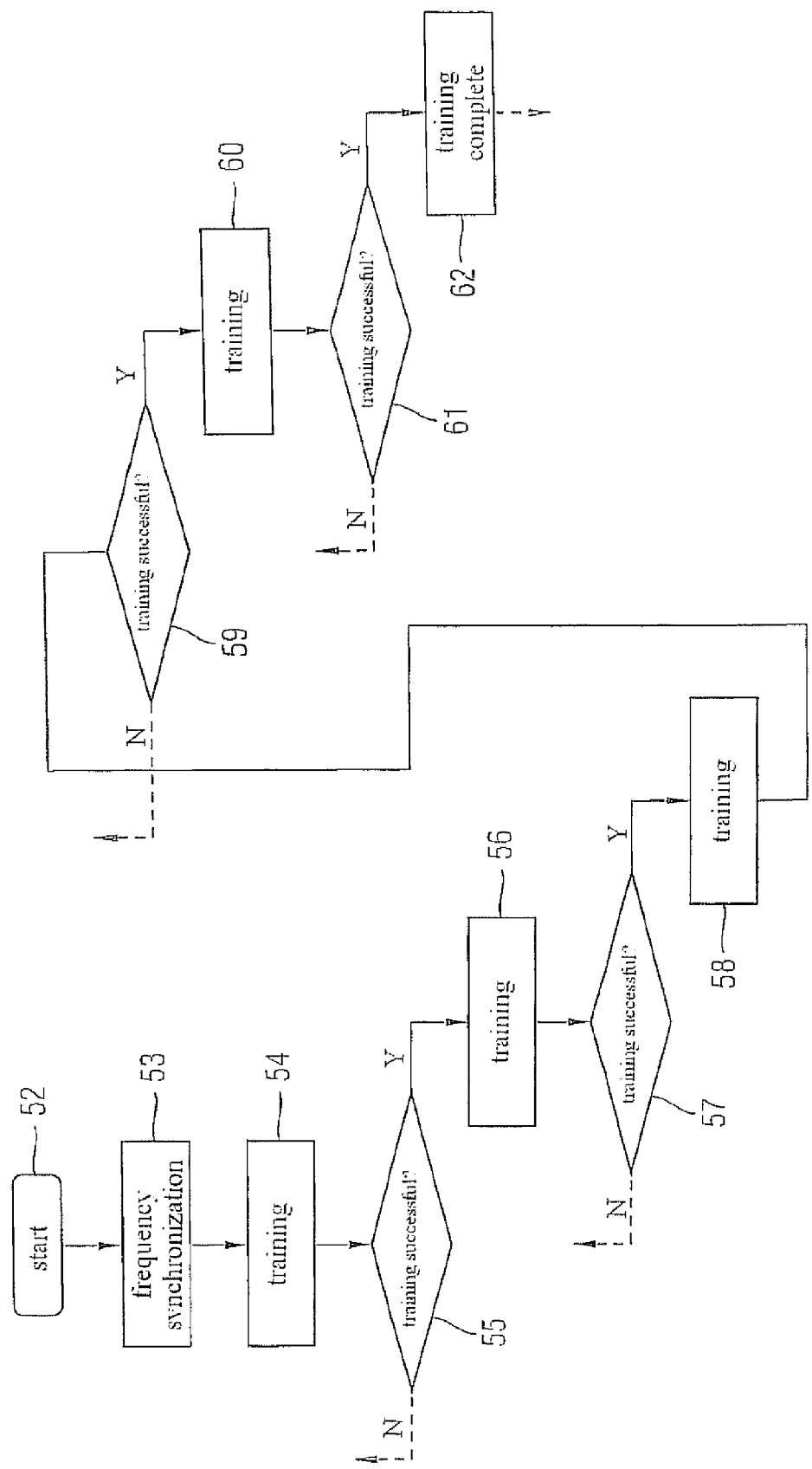
FIG. 8 a flowchart of an embodiment of a method of training connections in the memory arrangement of FIG. 7.

FIG. 8 illustrates an embodiment of a method of training the connections of FIG. 7. As in the embodiment of FIG. 5, the method is started at 52, for example with the power-up of the memory arrangement or at a reset of the system.

A frequency synchronization then takes place in step 53 (e.g., the phase-locked loops 19, 19A and 30 are locked in).

Then at 54, the connection between the memory bank 5 and the receiver portion 2 (i.e., the connection between the primary transmitter 16A and the receiver 24 and the connection between primary transmitter 23A and the receiver 25) is first trained. At 55 there is a check in the logic unit 29 via a status signal to determine whether the training was successful. A status signal as discussed with reference to FIG. 5 is an example the status signal used here. If the training was not successful, it is repeated, as indicated by a broken arrow in FIG. 8; otherwise the method proceeds to 56.

At 56 the connections between the secondary transmitters of the memory bank 4 and the primary receivers of the memory bank 5 are trained, in other words the connection between the secondary transmitter 18 and the primary receiver 17A and the connection between the secondary transmitter 21 and the primary receiver 20A. Similarly to at 55, the status of this training is evaluated at 57. This again in an embodiment may take place in the logic unit 29, since the forwarding of the status signal is possible without problems because of the previously trained connection between the memory bank 5 and the receiver portion 2. For this, the primary receiver 17A in this embodiment is temporarily connected to the primary transmitter 16A and the primary receiver 20A to the primary transmitter 23A as indicated by the arrows 87 and 88.

If the training was not successful, it is repeated as indicated by a broken arrow; step 56 alone may be repeated in an embodiment, and also the complete training up to now may be repeated in another embodiment of the invention. If the training was successful, the method proceeds to 58.

At 58, the connection between the transmitter portion 1 and the memory bank 4 is then trained, in other words, the connection between the transmitter 12 and the primary receiver 17 and between the transmitter 14 and the primary receiver 20. Using the repeaters formed from the primary receivers 17, 20 and the secondary transmitters 18, 21, the status of this training may also be evaluated with the logic unit 29. If the training was not successful, it is repeated, otherwise at 60, the connection between the primary transmitters 16, 23 of the memory bank 4 and the secondary receivers 15A, 22A of the memory bank 5 are finally trained. For this, the primary receivers 17, 20 are temporarily connected to the primary transmitters 16, 23 of the memory bank 4, as likewise indicated by the arrows 87, 88. This training too may be evaluated by the logic unit 29 at 61. If the training was not successful, it is repeated in turn as indicated by a broken arrow, otherwise the training is ended at 62 and, as indicated by a broken arrow, normal operation is started or other initialization steps are taken.

In the method of the embodiment illustrated in FIG. 8, the connections are trained sequentially from the receiver portion 2 to the transmitter portion 1. In an embodiment, logic unit 29 is configured to handle all evaluations and control the training. In such an embodiment, internal logic units 37, 37A may be omitted. In another embodiment, with the help of these internal logic units 37, 37A various training steps are performed in parallel. Possibilities for such parallel training are presented below with reference to FIGS. 9 and 10.

Figure 9:
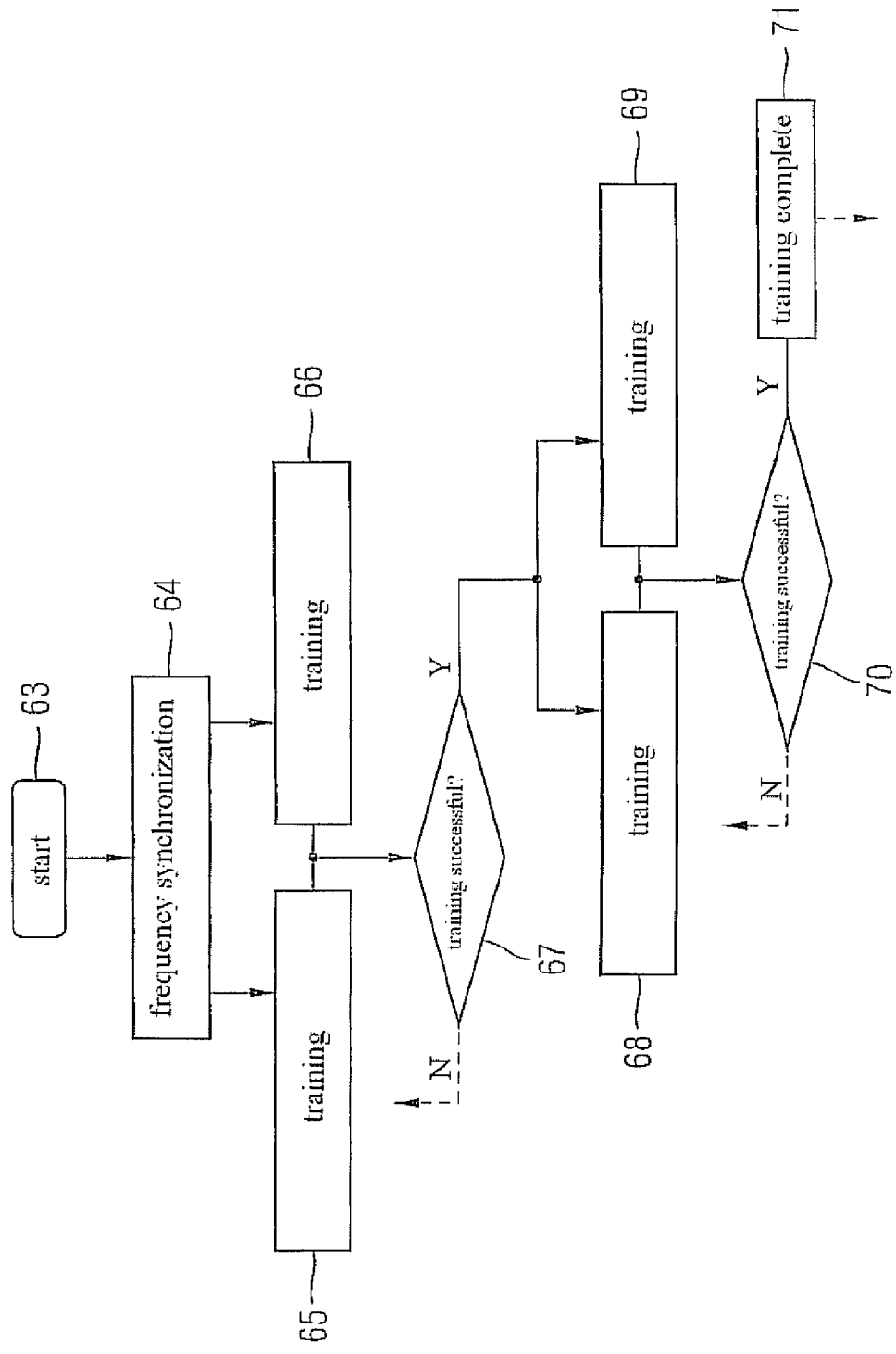
FIG. 9 a flowchart of an embodiment of a method of training connections in the memory arrangement of FIG. 7.

FIG. 9 illustrates a flowchart of an embodiment of a method of training connections in the memory arrangement of FIG. 7. Steps 63 and 64 in FIG. 9 correspond to steps 52 and 53 in FIG. 8, in other words the process is started at 63, and at 64 the frequency synchronization follows with the locking in of the phase-locked loops 19, 19A and 30.

Steps 65 and 66 of FIG. 9 correspond to the steps 54 and 56 of FIG. 8. In contrast to FIG. 8, however, these steps are now parallel in time. At 65, the connections between the primary transmitter 16A and the receiver 24 and between the primary transmitter 23A and the receiver 25 are trained, and in parallel to this at 66 the connections between the secondary transmitter 18 and the primary receiver 17A and between the secondary transmitter 21 and the primary receiver 20A are trained, the evaluation of the training sequences being performed using internal logic unit 37A in the embodiment of FIG. 9.

Then at 67, the status of the training is checked, which in an embodiment takes place via the logic unit 29 with a common status signal. If the training was not successful, it is repeated, otherwise the steps 68 and 69 are executed in parallel, corresponding to the steps 58 and 60 from FIG. 8.

At 68 the connections between the transmitter 12 and the primary receiver 17 and between the transmitter 14 and the primary receiver 20 are trained, while in parallel to this at 69 the connection between the primary transmitter 16 and the secondary receiver 15A and between the primary transmitter 23 and the secondary receiver 22A are trained. The internal logic unit 37 in an embodiment is used for the evaluation of the training sequences in step 68. The status of this training is in turn checked in the embodiment of FIG. 9 via the logic unit 29 with a common status signal. However, separate checking by the internal logic unit 37 for the training at 68 and logic unit 29 for the training at 69 is also possible in another embodiment. At 70, if this check determines that the training was unsuccessful, it is in turn repeated, otherwise the process is ended at 71, and as in the method of FIG. 8, a transition to normal operation follows, or further steps are executed for powering up the memory arrangement.

As in the embodiment from FIG. 8, connections are also provided between the primary receivers and primary transmitters of each memory bank 4, 5 for the training illustrated in FIG. 9. In particular, during the parallel processing at 65 and 66 the primary receiver 17A is connected to the primary transmitter 16A and the primary receiver 20A to the primary transmitter 23A, while during the parallel processing at 68 and 69 the primary receiver 17 is connected to the primary transmitter 16 and the primary receiver 20 to the primary transmitter 23 in the embodiment of FIG. 9.

Figure 10:
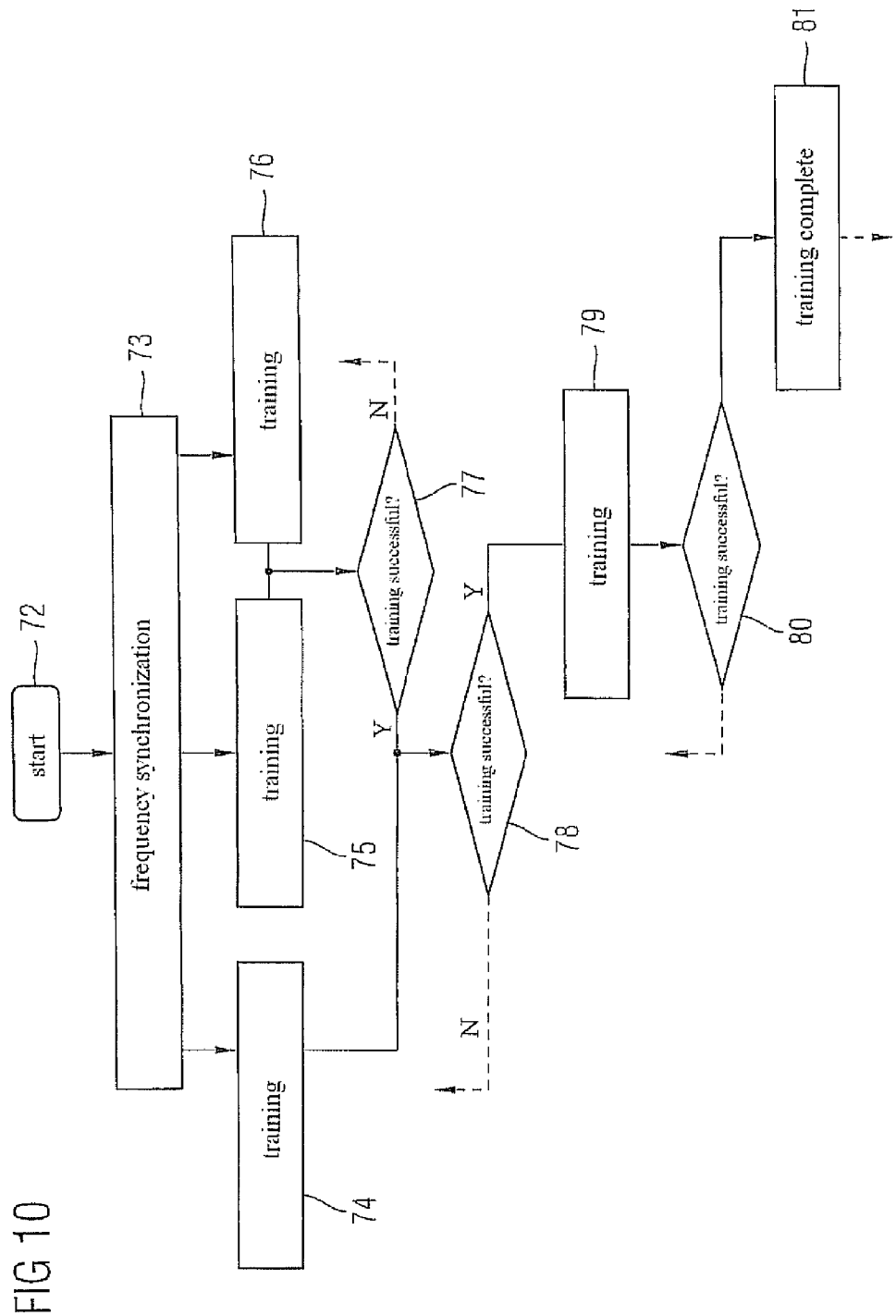
FIG. 10 a flowchart of an embodiment of a method of training connections in the circuit arrangement of FIG. 7.

An embodiment of a method for parallel training is illustrated in FIG. 10. Steps 72 and 73 from FIG. 10 in turn correspond to steps 63 and 64 from FIG. 9, meaning that the process is started at 72 and the frequency synchronization takes place at 73.

In the method of FIG. 10, three steps are now executed in parallel. Here steps 75 and 76 correspond to steps 65 and 66 from FIG. 9 (i.e., at 75 the connections between the primary transmitters 16A, 23A and the receivers 24 and 25 are trained and at 76 in parallel to this the connections between the secondary transmitters 18, 21 and the primary receivers 17A, 20A are trained). In parallel to this at 74, which corresponds to step 68 from FIG. 9, the connections between the transmitters 12 and 14 and the primary receivers 17 and 20 are trained. For these three parallel steps 74, 75 and 76, the primary receiver 17A is connected to the primary transmitter 16A and the primary receiver 20A to the primary transmitter 23A.

The evaluation of the training sequences at 74 may be done with the help of the internal logic unit 37, while the evaluation of the training sequences at 76 may take place with the help of the internal logic unit 37A.

At 77, the status of the training processes performed at 75 and 76 is then first jointly checked, for example with logic unit 29, and the training is repeated if necessary. Subsequently, at 78 the status of the training performed at 74 is additionally checked, and this training is repeated if necessary. In the sequence of status checks illustrated in FIG. 10, the status may always be checked with the logic unit 29. However, separate checks of the status with the internal logic units 37, 37A for the steps 74 and 76 and with the logic unit 29 for step 75 are also possible in another embodiment. If the status checks 77 and 78 illustrate that the training processes of steps 74-76 were successful, the connections between the primary transmitters 16, 23 and the secondary receivers 15A, 22A are finally trained at 79 corresponding to step 69 from FIG. 9. For this in turn the primary receivers 17, 20 are connected to the primary transmitters 16, 23.

The status of this training is checked at 80 by the logic unit 29. If the training was not successful, it is repeated, otherwise the process is ended at 82 corresponding to step 71 from FIG. 9, and there is a transition to normal operation or other initialization routines.

Other embodiments than the embodiments illustrated are possible, and the various training steps can also be differently arranged or processed in parallel. The embodiments illustrated are also easily applicable in a corresponding manner to more than two memory banks, which are interconnected like the memory banks 4 and 5 from FIG. 7. In such a case, all connections outgoing from the receiver portion 2 in an embodiment may (e.g., are trained sequentially corresponding to FIG. 8) or in another embodiment suitable connections are trained in parallel as illustrated in FIGS. 9 and 10.

Embodiments are not only applicable to memory arrangements in which several memory banks are connected in sequential order and where the memory banks each include two primary and secondary transmitters and receivers. An embodiment of a memory arrangement in which the structure is modified compared to FIGS. 3 and 7, and which is equally suitable for the implementation of an embodiment, is illustrated in FIG. 11.

Figure 11:
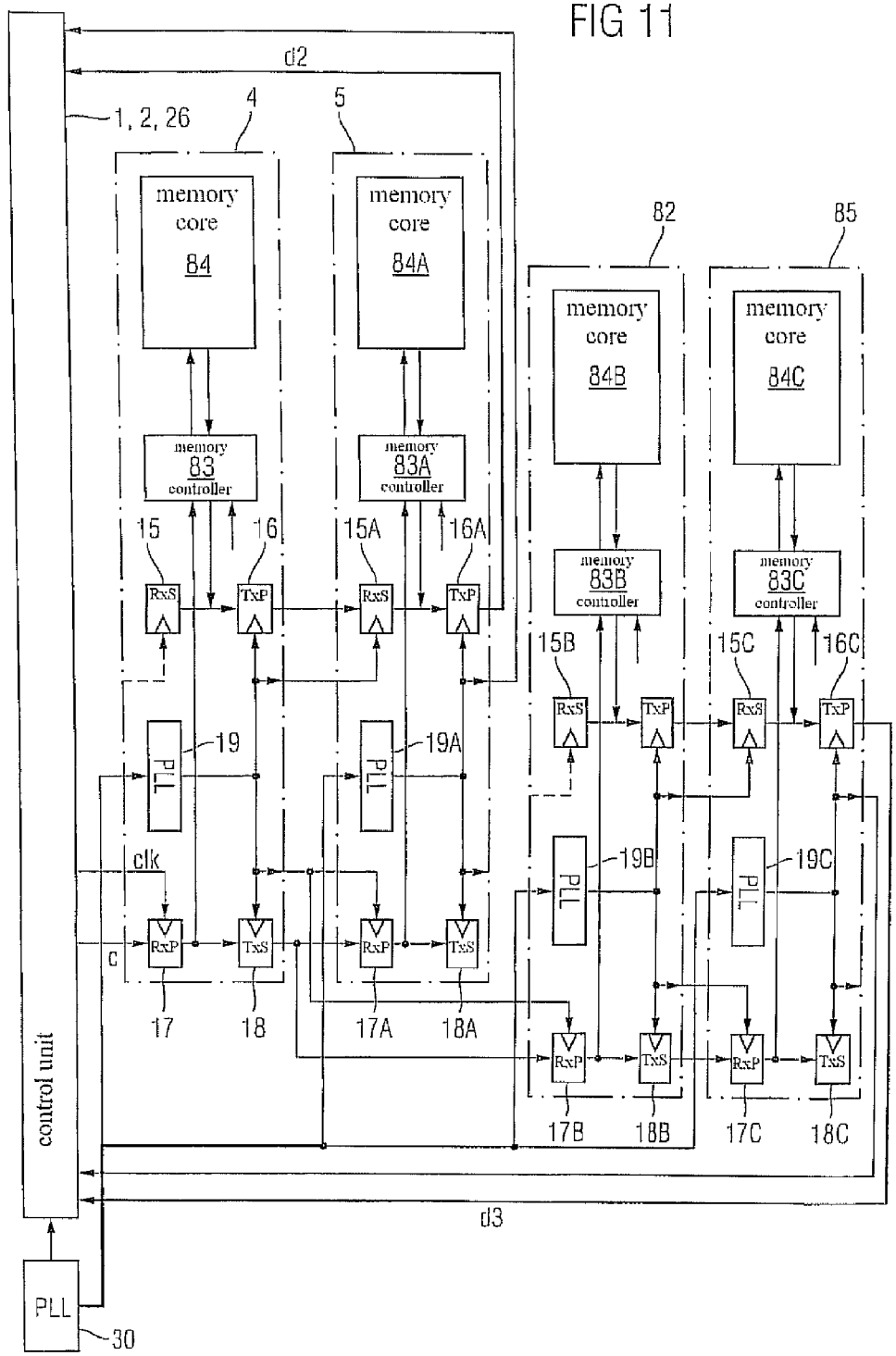
FIG. 11 a detailed block diagram of an embodiment of a memory arrangement.

In the memory arrangement embodiment of FIG. 11, the transmitter portion 1 and the receiver portion 2 are illustrated together. The memory arrangement from FIG. 11 further includes four memory banks 4, 5, 82 and 85, each with the same structure and each corresponding in structure to the upper half of the memory banks 4 and 5 from FIG. 7. The elements of the memory banks 5, 82 and 85 from FIG. 11, which correspond to the elements of the memory bank 4 from FIG. 11, bear the same reference numerals, supplemented in each case by A, B and C respectively. Accordingly only the memory bank 4 is once again briefly described below.

The secondary receiver 15, the primary transmitter 16, the primary receiver 17 and the secondary transmitter 18 of the memory bank 4 from FIG. 11 corresponds to the corresponding elements of the memory bank 4 from FIG. 7. The same applies to the phase-locked loop 19.

FIG. 11 additionally illustrates a memory controller 83 and a memory core 84. These elements are generally likewise present in the embodiments of FIGS. 3 and 7, but were left out from the Figures to simplify the illustrations.

In particular, the memory controller 83 is activated by the data c received from the primary receiver 17, to write data to the memory core 84 or to read therefrom. The data read is then transferred by the primary transmitter 16 as already described.

Also illustrated in FIG. 11 are the paths with which the phase-locked loops 19, 19A, 19B and 19C obtain a reference clock signal from the phase-locked loop 30.

The memory banks 4 and 5 in FIG. 11 are arranged like the memory banks 4 and 5 from FIG. 7 in a serial manner; a signal d2 in FIG. 11 is supplied to the receiver portion 2 and corresponds to the signal d1 from FIG. 7.

The memory banks 82 and 85 are likewise connected in a serial manner like the memory banks 4 and 5. As illustrated in FIG. 11, an input signal c for the memory bank 82 is "tapped" between the memory bank 4 and the memory bank 5. A signal d3 is supplied to the receiver portion 2, which essentially corresponds to the signal d2 from the memory banks 4 and 5.

The clock signal supplied by the clock generation unit 13 (not illustrated in FIG. 11) of the control unit to the memory bank 4 is denoted in FIG. 11 by clk.

In the memory arrangement embodiment of FIG. 11, embodiments of the same training methods as for the memory arrangement from FIG. 7 can be essentially used; here in particular the connection between the memory bank 85 with the receiver portion 2 and the memory bank 5 with the receiver portion 2 may be trained in parallel. In particular, both sequential training methods and parallel training methods are possible for the memory arrangement from FIG. 11. For example, the connections outgoing from the receiver portion 2 may be trained sequentially, beginning for example with the connections between the memory bank 85 and the receiver portion and the memory bank 5 and the receiver portion 2. However, as in FIG. 7, parallel training of different connections is also possible in FIG. 11, the methods of FIGS. 9 and 10 for example being applied both to the memory banks 4 and 5 and to the memory banks 81 and 85 from FIG. 11.

In the memory arrangement embodiment of FIG. 11, the various connections also may comprise several individual lines, which as already described with reference to FIG. 3 may be trained in parallel or sequentially.

As already mentioned, the embodiments are not restricted to the embodiments illustrated. Rather, embodiments can also be applied to other arrangements of memory banks in memory arrangements, and other training sequences than the training sequences illustrated are also possible.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of training connections in a memory arrangement, the method comprising:
   training a connection between a memory section and a receiver portion of a controller for controlling the memory arrangement before or simultaneously with a training of essentially all other connections between elements of the memory arrangement that are to be trained, wherein training a given connection comprises tuning of a transmitter and a receiver of the given connection to each other.

2. The method according to claim 1, wherein the tuning of the transmitter and the receiver of the given connection comprises at least one of the group consisting of:
   performing a frequency synchronization;
   performing a symbol synchronization;
   performing a frame synchronization; and
   performing a correction of a skew.

3. The method according to claim 2, wherein the frame synchronization is performed before or simultaneously with the symbol synchronization.

4. The method according to claim 1, wherein the training of the connections comprises:
transmitting and evaluating predetermined test signal sequences over the connections.

5. The method according to claim 1, wherein at least one of the connections comprises a plurality of parallel lines, wherein the training comprises:
training at least one part of the parallel lines in parallel.

6. The method according to claim 1, comprising:
performing a frequency synchronization between the memory section and the controller before the training of the connections.

7. The method according to claim 1, wherein the connections comprise unidirectional connections.

8. The method according to claim 1, wherein the other connections to be trained comprise a connection from a transmitter portion of the controller to the memory section, and wherein the connection from the transmitter portion to the memory section is trained simultaneously with the connection between the memory section and the receiver portion.

9. The method according to claim 1,
wherein the memory section comprises a first memory bank and a second memory bank,
wherein the other connections to be trained comprise a connection from a transmitter portion of the controller to a primary receiver of the first memory bank, a connection between a primary transmitter of the first memory bank and secondary receiver of the second memory bank and a connection between a secondary transmitter of the first memory bank with a primary receiver of the second memory bank;
wherein the connection between the memory section and the receiver portion comprises a connection between the primary transmitter of the second memory bank and the receiver portion; and
wherein the primary receiver and the secondary transmitter, and the secondary receiver of the second memory bank and the primary transmitter of the second memory bank, respectively provide a repeater function.

10. The method according to claim 9, comprising:
training the connection between the primary transmitter of the second memory bank with the receiver portion;
then training the connection between the secondary transmitter of the first memory bank and the primary receiver of the second memory bank;
then training the connection between the transmitter portion and the primary receiver of the first memory bank; and
then training the connection between the primary transmitter of the first memory bank and the secondary receiver of the second memory bank.

11. The method according to claim 9, comprising:
time-parallel training of the connection between the primary transmitter of the second memory bank and the receiver portion and between the primary transmitter of the first memory bank and the secondary receiver of the second memory bank; and
then time-parallel training of the connections between the transmitter portion and the primary receiver of the first memory bank and between the primary transmitter of the first memory bank and the secondary receiver of the second memory bank.

12. The method according to claim 9, comprising:
time-parallel training of the connections between the transmitter portion and the primary receiver of the first memory bank, between the secondary transmitter of the first memory bank and the primary receiver of the second memory bank and between the primary transmitter of the second memory bank and the receiver portion; and
then training of the connection between the primary transmitter of the first memory bank and the secondary receiver of the second memory bank.

13. The method according to claim 1, comprising:
connecting a receiver for receiving data to a transmitter during the training of the connections, this connection being interrupted during normal operation.

14. A method for training connections in a memory arrangement, the method comprising:
training at least two different connections of the memory arrangement in parallel, wherein training a given connection comprises tuning of a transmitter and a receiver of the given connection to each other.

15. A memory arrangement, comprising:
a memory section configured to store and read out data;
a control circuit configured to control writing and reading operations of the memory arrangement, the control circuit comprising a transmitter portion configured to transmit data to the memory section and a receiver portion configured to receive data from the memory section; and
at least one logic circuit configured to train connections in the memory arrangement, wherein the at least one logic circuit is configured such that a connection between the memory section and the receiver portion is trained before or simultaneously with all other connections between elements of the memory arrangement to be trained, wherein training a given connection comprises tuning of a transmitter and a receiver of the given connection to each other.

16. The memory arrangement according to claim 15, wherein the tuning of the transmitter and the receiver of the given connection comprises at least one of the group consisting of: frequency synchronization, a symbol synchronization, a frame synchronization, and a correction of a skew.

17. The memory arrangement according to claim 16, wherein the at least one logic circuit is configured to perform the frame synchronization before or simultaneously with the symbol synchronization.

18. The memory arrangement according to claim 15, wherein the training of the connections comprises the transmitting and evaluation of a predetermined test signal sequence over the connection.

19. The memory arrangement according to claim 15, wherein at least one of the connections comprises a plurality of parallel lines, wherein the at least one logic circuit is configured such that at least one part of the parallel lines is trained in parallel.

20. The memory arrangement according to claim 15, comprising:
circuitry to perform a frequency synchronization between the memory section and the control circuit before the training of the connections.

21. The memory arrangement according to claim 15, wherein the memory section comprises a first memory bank and a second memory bank;
wherein the other connections to be trained comprise a connection from a transmitter portion of the control circuit to a first receiver of the first memory bank, a connection between a first transmitter of the first memory bank and a second receiver of the second memory bank, a connection between a second transmitter of the first memory bank with a first receiver of the second memory bank;

wherein the connection between the memory section and the receiver portion comprises a connection between a first transmitter of the second memory bank and the receiver portion;

wherein the first receiver and the second transmitter of the first memory bank, and the second receiver and the first transmitter of the second memory bank, each are configured to provide a repeater function.

22. The memory arrangement according to claim 15, comprising:

a switchable connection configured to selectively interconnecting a receiver configured to receive data with a transmitter.

23. The memory arrangement according to claim 15, wherein the at least one logic circuit comprises a central control unit configured to control the training of the connections.

24. A memory arrangement, comprising:

a memory section configured to store and read out data;

a controller configured to control writing and reading operations of the memory arrangement, the controller comprising a transmitter portion configured to transmit data to the memory section and a receiver portion configured to receive data from the memory section; and a training logic configured to train connections in the memory arrangement, the training logic configured to train at least two connections of the memory arrangement in parallel, wherein training a given connection comprises tuning of a transmitter and a receiver of the given connection to each other.

25. A memory arrangement, comprising:

means for storing and reading data;

means for controlling writing and reading operations of the memory arrangement;

means for transmitting data to the memory section;

means for receiving data from the memory section; and means for training at least two connections of the memory arrangement in parallel, wherein training a given connection comprises tuning of a transmitter and a receiver of the given connection to each other.

26. The method of claim 1, wherein the tuning of the transmitter and the receiver of the given connection comprises a tuning with regard to timing.

* * * * *